(12) United States Patent
Kimura et al.

(10) Patent No.: US 6,996,828 B1
(45) Date of Patent: Feb. 7, 2006

(54) MULTI-OS CONFIGURATION METHOD

(75) Inventors: Shinji Kimura, Sagamihara (JP); Toshiaki Arai, Machida (JP); Masahide Sato, Kawasaki (JP); Toshikazu Umezu, Toki (JP)

(73) Assignee: Hitachi, Ltd., Tokyo (JP)

( * ) Notice: Subject to any disclaimer, the term of this patent is extended or adjusted under 35 U.S.C. 154(b) by 594 days.

(21) Appl. No.: 09/649,958

(22) Filed: Aug. 29, 2000

Related U.S. Application Data

(63) Continuation-in-part of application No. 09/151,270, filed on Sep. 11, 1998, now Pat. No. 6,772,419.

(30) Foreign Application Priority Data

Sep. 12, 1997 (JP) .................................. 9-248178
Feb. 23, 2000 (JP) .............................. 2000-052108

(51) Int. Cl.
*G06F 3/00* (2006.01)

(52) U.S. Cl. ...................... 719/319; 719/312; 719/320; 719/321; 719/327; 719/328; 718/102; 718/103; 718/104; 718/105; 718/107; 718/108

(58) Field of Classification Search ................ 709/318, 709/312, 319, 103, 327, 107, 320, 321, 328; 718/102, 103, 104, 105, 107, 108
See application file for complete search history.

(56) References Cited

U.S. PATENT DOCUMENTS

| | | | |
|---|---|---|---|
| 4,747,040 A * | 5/1988 | Blanset et al. .............. | 718/108 |
| 5,721,922 A | 2/1998 | Dingwall | |
| 6,269,409 B1 * | 7/2001 | Solomon ..................... | 709/329 |
| 6,678,712 B1 * | 1/2004 | McLaren et al. ........... | 718/100 |
| 2002/0004810 A1 * | 1/2002 | Reneris ....................... | 709/104 |

FOREIGN PATENT DOCUMENTS

| | | | |
|---|---|---|---|
| JP | 363311442 A | * | 12/1988 |
| JP | 11-149385 | | 6/1999 |
| JP | 2000-76087 | | 3/2000 |

\* cited by examiner

OTHER PUBLICATIONS

Andrew S. Tanenbaum, "Modern Operating Systems", Prentice Hall, 1992, pp. 21-22 and 637-641.

*Primary Examiner*—John Follansbee
*Assistant Examiner*—Ashok Patel
(74) *Attorney, Agent, or Firm*—Mattingly, Stanger, Malur & Brundidge, P.C.

(57) ABSTRACT

A physical memory of a single computer is divided for each of a plurality of operating system (OS). A first OS is first loaded into the computer and runs. A multi-OS management program common to a plurality of OSs is incorporated into a virtual address space of the first OS as a device driver of the first OS. The multi-OS management program incorporated as the device driver is rearranged in a memory area shared by OSs so that the multi-OS management program has the same virtual address in any OS. In this state, the second OS program itself is loaded in the virtual address space of the second OS by execution of the multi-OS management program in the first OS. Execution of the multi-OS management program is switched from the multi-of management program in the first OS to the multi-OS management program in the second OS. Then, the second OS is started by execution of the multi-OS management program in the second OS to thereby run the plurality of OSs on the single computer.

9 Claims, 17 Drawing Sheets

| VIRTUAL PAGE NUMBER | VALID | PHYSICAL PAGE NUMBER |
|---|---|---|
| 0 | ✓ | 0 |
| 1 | ✓ | 56 |
| 2 | ✓ | 23 |
| 3 | | |
| 4 | | |
| 5 | ✓ | 32 |
| ⋮ | ⋮ | ⋮ |
| 998 | ✓ | 498 |
| 999 | ✓ | 499 |
| 1000 | ✓ | 500 |

| VIRTUAL PAGE NUMBER | VALID | PHYSICAL PAGE NUMBER |
|---|---|---|
| 0 | | |
| 1 | ✓ | 123 |
| 2 | ✓ | 124 |
| 3 | | |
| 4 | ✓ | 127 |
| 5 | | |
| ⋮ | ⋮ | ⋮ |
| 998 | ✓ | 498 |
| 999 | ✓ | 499 |
| 1000 | ✓ | 500 |

| INTERRUPT NO. | INTERRUPT HANDLER START ADDRESS |
|---|---|
| 0 | 800h |
| 1 | 830h |
| 2 | 500h |
| 3 | |
| 4 | |
| 5 | |

| NAME | CONTENTS | |
|---|---|---|
| MEMORY SIZE | NUMERICAL VALUE | ~701 |
| OBJECT FILE | kernel, driver1, driver2 | ~703 |
| driver2 | INHERENT DATA OF DRIVER 2 | |
| Secondary OS | INHERENT DATA OF SECOND OS | ~705 |
| | | |

| INTERRUPT NUMBER | USAGE STATE |
|---|---|
| 0 | |
| 1 | |
| 2 | |
| 3 | |
| 4 | IN USE |
| 5 | IN USE |

900
901
902

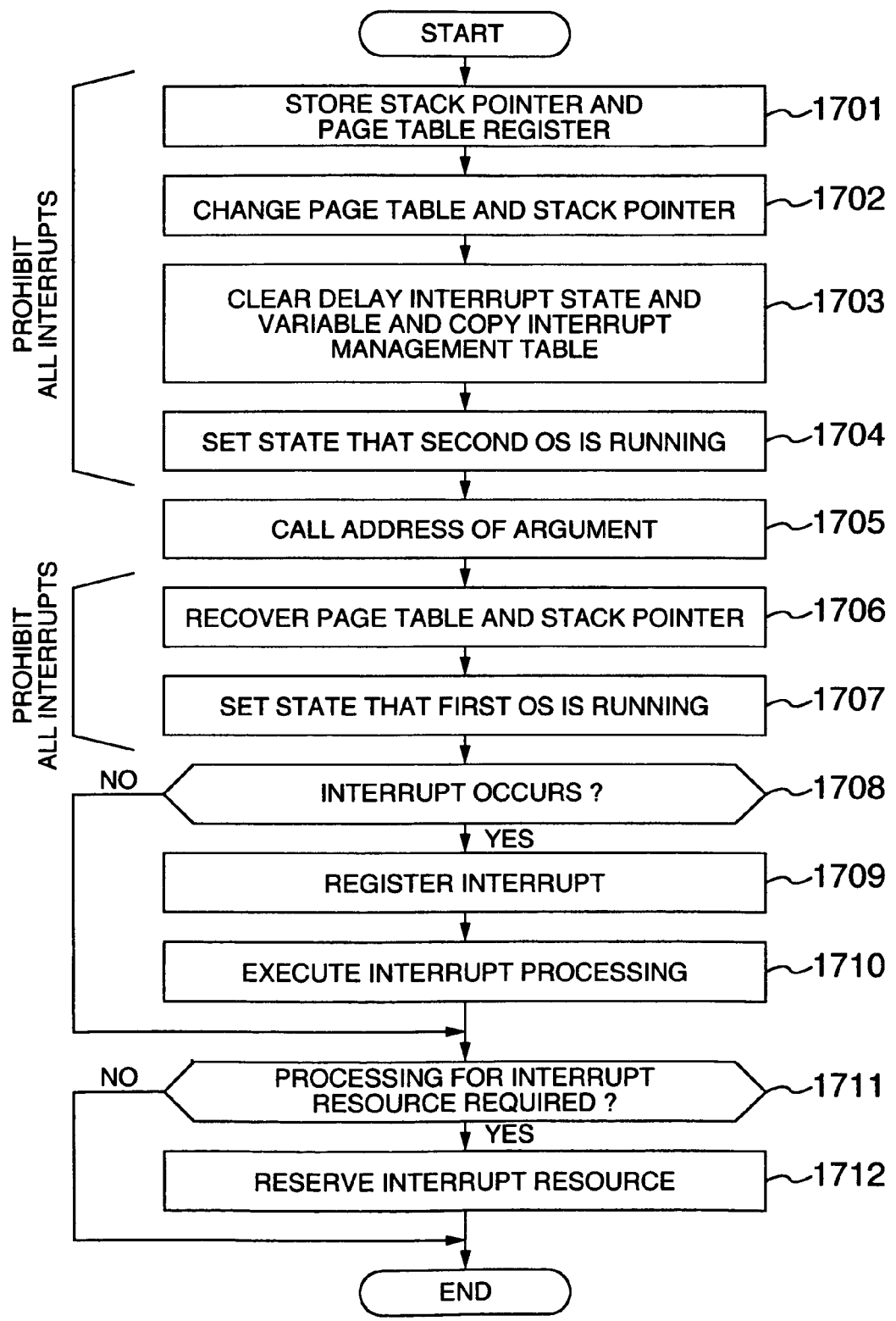

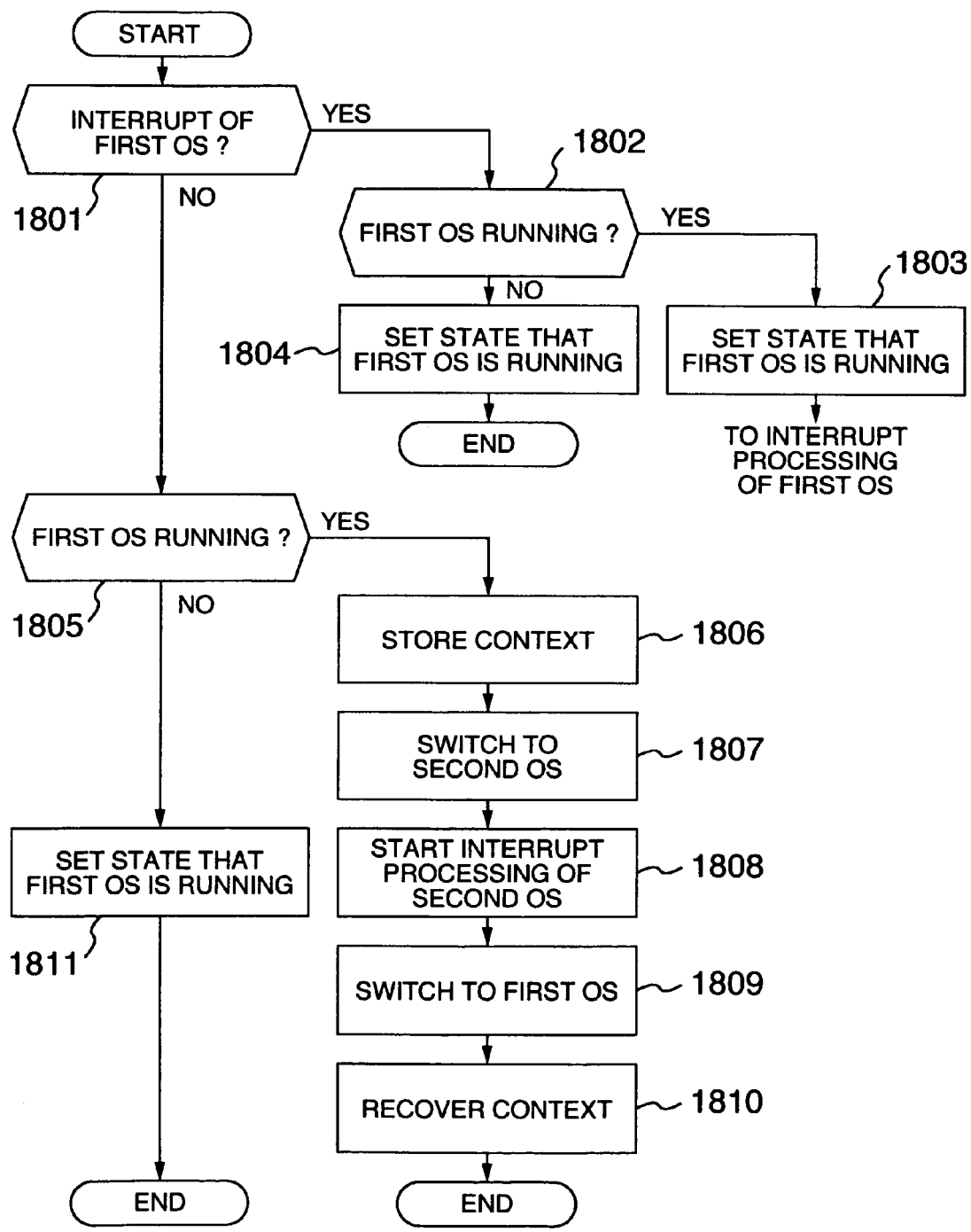

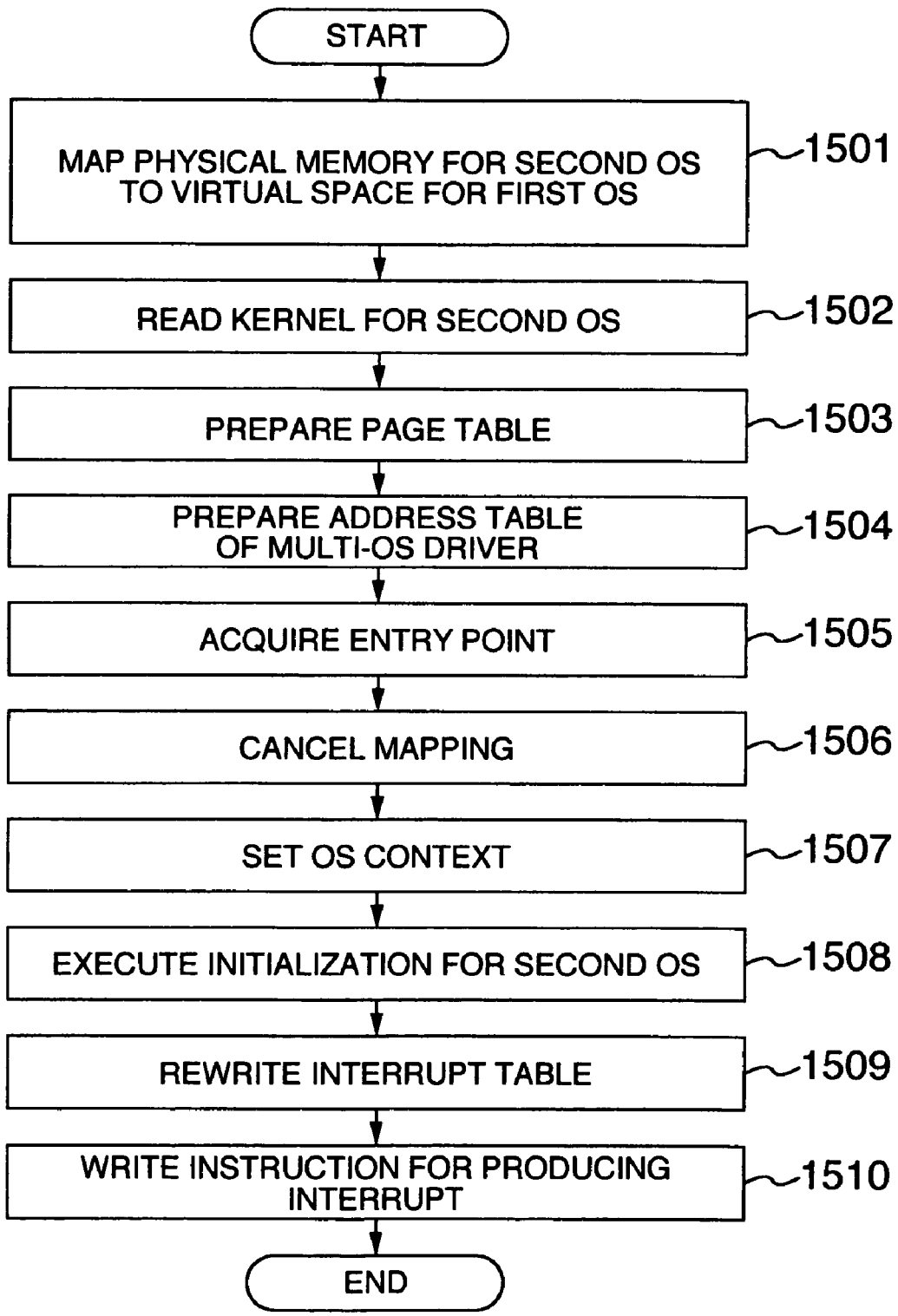

MULTI-OS CONFIGURATION METHOD

CROSS-REFERENCE TO RELATED APPLICATION

This is a Continuation-in-part of application Ser. No. 09/151,270 filed Sep. 11, 1998, now U.S. Pat. No. 6,772,419, the contents of which are incorporated herein by reference.

BACKGROUND OF THE INVENTION

The present invention relates to a control method for computers, and more particularly to a method of running a plurality of operating systems (OSs) on a single computer.

A general computer runs only a single OS which manages computer resources such as a processor, a memory and a secondary storage and performs resource scheduling in order to realize an efficient operation of the computer.

There are various types of OSs, some excellent in batch processing, some excellent in time sharing system (TSS), and some excellent in graphical user interface (GUI).

There are needs of using a plurality of OSs on a single computer. For example, a mainframe is desired to operate both OS for executing practical online transaction processings and OS for research and development. There is also a requirement for running both OS having comparative GUI and OS excellent in real time.

However, each OS is assumed to manage computer resources by itself and a concurrent presence of a plurality of OSs is impossible unless some measure is incorporated.

As a measure for operating a plurality of OSs on a single computer, a virtual machine system realized by a mainframe is known (refer to "Modern Operating Systems": Andrew S. Tanenbaum, Prentice Hall, 1992 (pp. 21 to 22). In a virtual machine system, a virtual machine control program dominantly manages all hardware resources, and virtualizes these resources to configure the virtual machine system. A controller of a virtual machine system virtualizes physical memories, input/output (I/O) devices, external interrupts and the like.

For example, each divided physical memory is handled by each virtual machine as if it is a memory starting form the address "0". Device numbers identifying I/O devices are similarly virtualized. In addition, a magnetic disk is also virtualized by dividing its memory area.

Each OS is scheduled by the control program so that OS runs on a virtual machine configured by the control program. However, in a virtual machine system of a mainframe, since computer resources are completely virtualized and divided, the controller of a virtual machine becomes complicated.

Setting a control register from an OS running a virtual machine and a privilege instruction such as an I/O instruction issued by the OS, are required to be emulated by a virtual machine control program if there is no specific hardware support. A problem of a large overhead therefore occurs. In practice, this overhead is reduced in a mainframe which configures virtual machines, by adding hardware realizing processor functions and micro codes specific to the virtual machine.

The virtual machine system aims at completely virtualizing computer resources, so that the system becomes complicated. Furthermore, to realize a high performance of a virtual machine, specific hardware is required.

A mircokernel is known as techniques for providing a single computer with interface with a plurality of OSs (refer to "Modern Operating Systems": Andrew S. Tanenbaum, Prentice Hall, 1922 (pp. 637 to 641)). If a microkernel is used, an operating system server is configured on the microkernel, the server providing an OS function transparent to a user which utilizes computer resources via the server. If each OS is provided with such a server, a user is provided with various OS environments.

With the microkernel system, however, it is necessary to newly configure an operating system server compatible with a microkernel. In many cases, currently existing OSs are modified so as to run on the microkernel. The core portion of each OS such as scheduling and memory management is required to be modified. There are many portions to be modified. In addition, these modified portions are related also to the main part of each OS, so that the modification work is complicated and difficult.

Still further, although the operating system server utilizes services of the microkernel, this operation is not used by a general OS so that an overhead increases and the system performance is degraded.

SUMMARY OF THE INVENTION

It is an object of the present invention to realize concurrent and parallel running of a plurality of operating systems on a single computer without using specific hardware.

It is another object of the present invention to provide an OS configuration method in which after one OS is started another OS can be loaded in a computer and run without using specific hardware in order to run a plurality of operating systems on a single computer.

In order to achieve the above objects, in the multi-OS configuration method according to the present invention, a physical memory is divided for each of a plurality of operating systems. An interrupt management program independent of the operating system receives all of external interrupts and decides an interrupt handler of an operating system to be started in accordance with an interrupt factor. The timing of starting the interrupt handler is decided in accordance with a running state of the operating system and the interrupt handler of each operating system is started in accordance with the timing to thereby run the plurality of operating systems on a single computer.

According to the present invention, after a first OS runs, a multi-OS management program including the interrupt management program is loaded in a computer so that a device driver of the first OS is loaded in the computer. The loaded multi-OS management program is used to load another OS and start it, so that the multi-OS computer system is configured. In this manner, the function of complementing the first OS can be added easily to configure the computer system having high-degree functions. Since a second OS is different from an ordinary device driver and can be loaded with the function of running quite independent of the first OS, the high reliability function independent of the first OS can be added thereto.

Further, in the method of configuring a multi-OS environment by using the microkernel system, there is a problem that it is difficult to configure an operating system server which provides an interface for each operating system. According to the present invention, the multi-OS environment can be configured easily only by adding an interrupt management portion without modifying the operating system.

In addition, by realizing the function of implementing the multi-OS as the device driver of the OS started first, the processing of the first OS is not required to be modified. Accordingly, function can be added to the existing operating system easily.

Furthermore, in the environment that a plurality of operating systems run simultaneously on a single computer, one operating system can monitor a failure of other operating systems and the monitoring operating system can perform diagnosis and recovery of the failure of the operating system to be monitored to thereby improve the reliability and the maintenance of the whole computer.

Moreover, by assigning the interrupt resources used by the hardware device to a plurality of operating systems, the hardware device assigned to one operating system can be utilized by other operating systems after completion of usage by the one operating system.

According to the present invention, a plurality of operating systems can run in a single computer in the concurrent and parallel manner without using specific hardware and emulating a privilege instruction such as I/O processing and the like.

BRIEF DESCRIPTION OF THE DRAWINGS

FIG. 7 shows a structure of a kernel configuration information file of a first OS;

FIG. 17 is a flow chart showing a switching processing procedure of a running OS;

FIG. 18 is a flow chart showing an interrupt processing procedure; and

FIG. 19 is a flow chart showing a loading processing procedure of the second OS for adding a monitoring function to the second OS.

DESCRIPTION OF THE EMBODIMENTS

Embodiments of the invention will be described with reference to the accompanying drawings.

Figure 1:
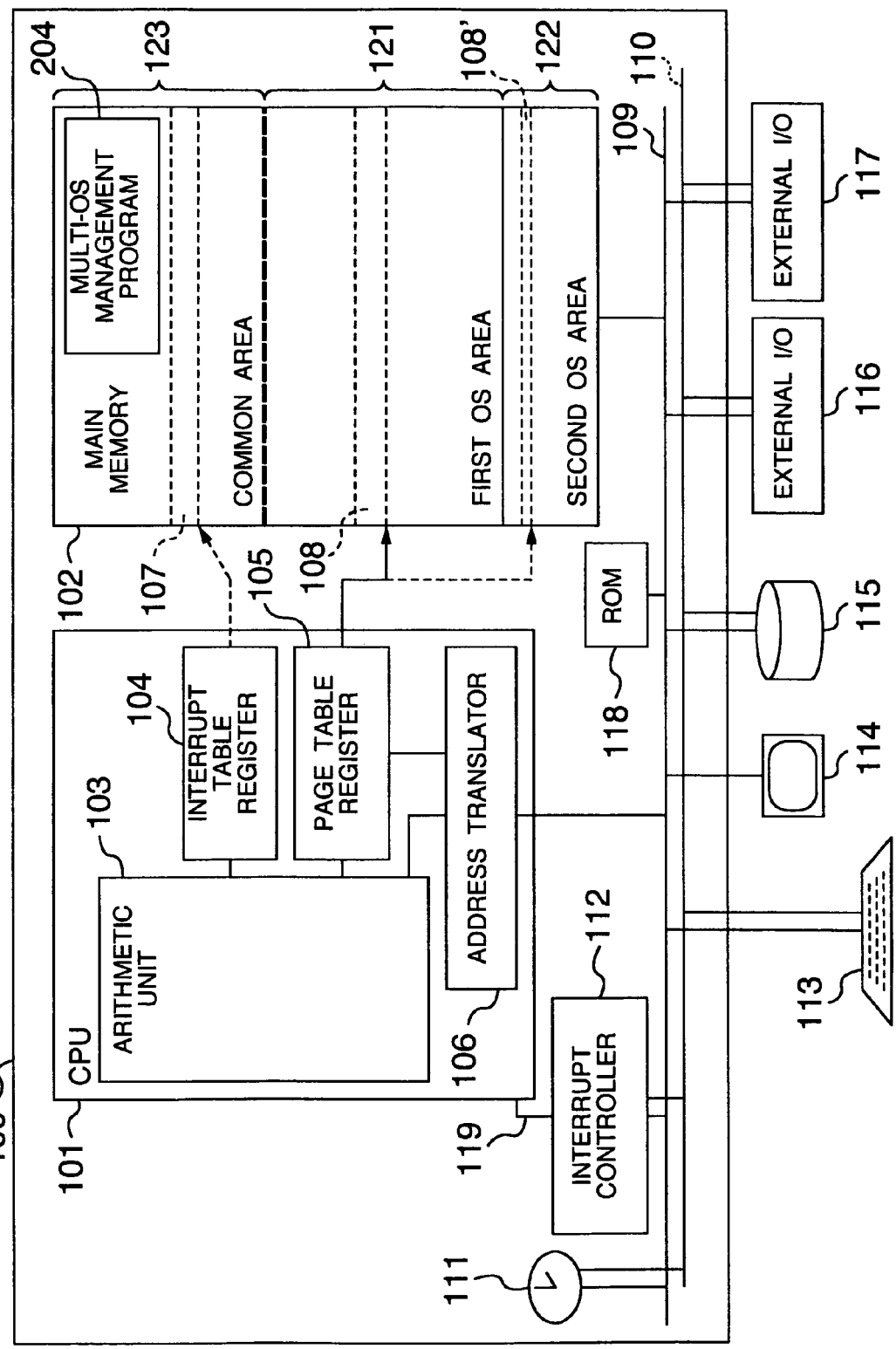
FIG. 1 is a block diagram schematically illustrating a computer according to an embodiment of the present invention.

FIG. 1 is a diagram showing the configuration of a computer 100 according to an embodiment of the invention. In FIG. 1, the computer 100 is constituted of a processor 101, a main memory 102, a bus 109, an interrupt signal line 110, a clock interrupt generator 111, an interrupt controller 112, a read only memory (ROM) 118 storing a program for a booting procedure, and an interrupt bus 119.

The interrupt signal line 110 connects the interrupt controller 112 to external I/O devices 113 to 117.

When one I/O device generates an interrupt signal, the interrupt controller 112 receives this interrupt signal via the interrupt signal line 110. The interrupt controller 112 changes this interrupt signal to a numerical value and passes it via the interrupt bus 119 to the processor 101.

The clock interrupt generator 111 periodically generates an interrupt signal.

The interrupt controller 112 receives an interrupt request from the external I/O device, generates an interrupt signal represented by a numerical value specific to the interrupt requester, and passes it to the processor 101. It is assumed that the interrupt signal from a particular I/O device can be made not to be notified to the processor 101 in accordance with an instruction from the processor 101.

The processor 101 is constituted of an arithmetic unit 103, an interrupt table register 104, a page table register 105, and an address translator 106.

The interrupt table register 104 indicates a virtual address of the interrupt table 107 referred to by the processor 101. Although the details of the interrupt table 107 will be later given, this table stores a start address of an interrupt handler for each interrupt number. The interrupt table 107 is stored in a common area 123 of the main memory 102. The reason why the connection between the interrupt table register 104 and the interrupt table 107 is indicated by a broken line in FIG. 1 is that the interrupt table register 104 indicates the virtual address of the interrupt table 107. When an interrupt occurs, the processor 101 receives the interrupt number from the interrupt controller 112. By using this number as a search index, the processor acquires an interrupt handler address from the interrupt table 107 to pass the control to the interrupt handler.

The page table register 105 indicates the page table 108. The page table register 105 stores a physical address of the page table 108. The page table 108 is used by a first OS. A page table 108' for a second OS is also stored in a second OS area 122.

The address translator 106 receives an instruction address or an operand address from the arithmetic unit 103, and performs a virtual-real address translation in accordance with the contents of the page table 108 indicated by the page table register 105.

In the embodiment shown in FIG. 1, the external I/O devices connected to the computer 100 includes a keyboard 113, a display 114, a magnetic disk 115 and other external devices 116 and 117. The devices excepting the display 114 are connected via the interrupter signal line 110 to the interrupt controller 112.

The contents of the main memory 102 will be described. In this embodiment, two OSs run on the computer 101 which are called a first OS and a second OS. It is assumed that as the computer 100 starts, the first OS runs thereon and the external I/O devices 116 and 117 are managed by the second OS.

The first OS reserves a physical memory area 122 for the other OS or second OS at an earlier setup stage. Namely, the first OS reserves the physical memory area 122 so that the first OS cannot use this physical memory area reserved for the second OS. FIG. 1 illustrates a state that the second OS is loaded in the area 122 assigned by the first OS.

As described earlier, the main memory 102 has the common area 123 shared by all OSs. The common area 123 stores therein the interrupt table 107, a multi-OS management program 204 including an interrupt management program, an interrupt discrimination table 1520, an interface module accessible from each OS, and the like.

In the embodiment shown in FIG. 1, the second OS runs with a priority over the first OS. This means that the first OS can run only while the second OS is in an idle state. The first OS cannot run unless the process by the second OS is completed.

When the external I/O device managed by the second OS issues an interrupt, the process by the first OS is intercepted, and the control is passed to the second OS. Even if an interrupt is issued from the external I/O device managed by the first OS during the execution of the second OS, this interrupt process is postponed until the process by the second OS is completed.

The memory areas 121 and 122 for the first and second OSs are definitely discriminated in the main memory 102 and are not accessible from the other OS, excepting the common area 123 where the interrupt handler and the like are stored. It is therefore possible not to erroneously access the other OS storage area and prevent any system failure. The external I/O devices 113 to 115 managed by the first OS and the external I/O devices 116 and 117 managed by the second OS are also definitely discriminated.

Figures 2, 3A, 3B:
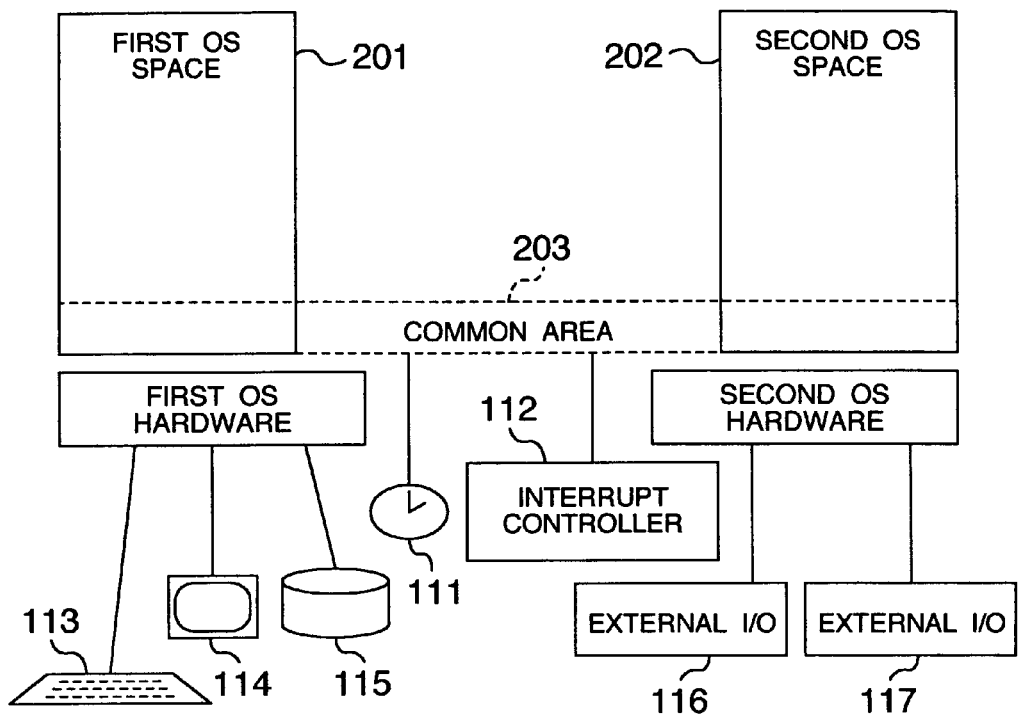
FIG. 2 is a schematic diagram illustrating a computer.
FIGS. 3A and 3B show structure of page tables.

FIG. 2 is a diagram illustrating a concept of the relation between two OSs of the embodiment. Each OS occupies an independent address space. Reference numeral 201 represents a virtual space for the first OS, and reference numeral 202 represents a virtual space of the second OS. A real storage area for the second OS space 202 is in the second OS area of the main memory 102 shown in FIG. 1.

A common area 203 is mapped to partial areas of the virtual spaces. A real storage area for the common area 203 is the common area 123 of the main memory 102 shown in FIG. 1.

FIG. 2 also shows the hardware managed by each OS. The first OS manages the keyboard 113, display 114 and magnetic disk 115, whereas the second OS manages the I/O devices 116 and 117. Although the clock 111 and the interrupt controller 112 are originally managed by the first OS, they are managed by a program in the common area 203 as shown in FIG. 2.

FIGS. 3A and 3B respectively show the structures of page tables 108 and 108' of the embodiment.

The page table 108 has virtual page descriptive entries for each virtual page of the virtual address space 201 of the processor 101. The entries include a valid bit 301 and a physical page number 302.

The valid bit 301 indicates whether a physical page corresponding to the virtual page is being allocated, i.e. whether the virtual-real address translation is possible. For example, the virtual page No. 3 of the page table 108 is not set with a valid bit. It means that the physical page corresponding to the virtual page No. 3 is not present in the main memory 102. When an access to a virtual page not set with the valid bit 301 is generated, the processor generates a page fault.

The physical page number 302 stores the physical page number corresponding to the virtual page.

The address translator 106 translates a virtual address supplied from the arithmetic unit 103 into a real address, by referring to the contents of the page table 108 or 108' indicated by the page table register 105. The processor 101 accesses the main memory 102 by using the translated real address.

By switching the page table 108 to the page table 108', the independent space 202 can be configured. The first OS space 201 and second OS space 202 shown in FIG. 2 can be configured. The common area 203 can be formed by mapping the same physical pages contained in the physical memory area 123 to the entries of the page tables corresponding to the common area 203 of both the OSs.

The page table 108' shown in FIG. 3B is used for the second OS. In this example, the physical page corresponding to the virtual pages No. 998–1000 of the page table 108' is assigned the same physical pages No. 498–500 as the page table 108. This means that these entries form the common area 203. The other virtual pages are assigned the physical pages different from those made valid by the first OS. This means that the first and second OSs independently form the respective spaces 201 and 202.

Figures 4, 5:
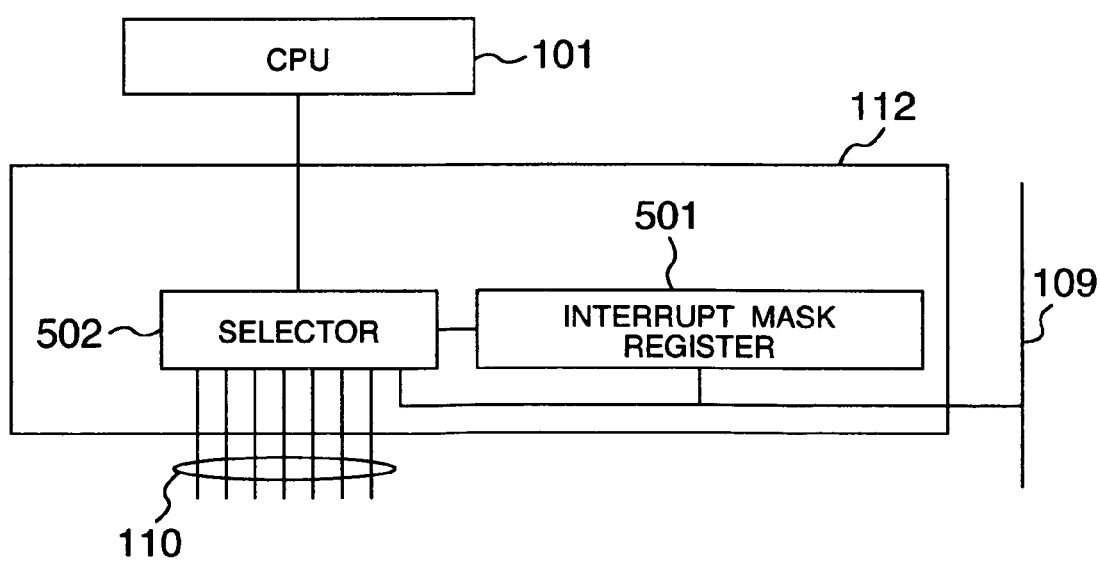
FIG. 4 shows a structure of an interrupt table.
FIG. 5 illustrates an interrupt controller.

FIG. 4 shows the structure of the interrupt table 107.

The interrupt table 107 stores therein a virtual address 401 of an interrupt handler for each interrupt number which the processor 101 receives from the interrupt controller 112. Upon reception of the interrupt request from the interrupt controller 112, the processor 101 acquires an address of the interrupt handler corresponding to the interrupt number from the interrupt table 107 designated by the interrupt table register 104, passes the control to this address, and starts a process of the interrupt.

FIG. 5 shows the interrupt controller 112. The interrupt controller 112 has an interrupt mask register 501 and a selector 502.

An I/O device which issues an interrupt is connected via the interrupt signal line 110 to the interrupt controller 112. A priority order of interrupt is determined based on which interrupt signal line 110 is used for the interrupt signal. It is herein assumed that the interrupt signal corresponding to the interrupt No. 1 has a highest priority.

The interrupt signal line 110 is connected to the selector 502. Upon reception of the interrupt signal, the selector 502 holds the information that there is an interrupt still not processed, until the processor notifies a reception of the subject interrupt.

The interrupt mask register 501 holds the information that an interrupt issued from the I/O device is allowed to be notified to the processor 101. The contents of the interrupt mask register 501 can be set by an I/O instruction from the processor 101.

When an interrupt request is received from the interrupt signal line 110 and when the contents of the interrupt mask register 501 are renewed, the selector 502 compares the interrupt still not processed and held therein with the contents of the interrupt mask register 502, to thereby determine whether the interrupt is notified to the processor 101. Specifically, among those interrupts still not processed and held in the selector 502, interrupts which are allowed to be notified to the processor 101 by the interrupt mask register 501 are sequentially notified to the processor 101, in the order starting from the highest priority order. In this case, the selector 502 sends the numerical signal corresponding to the interrupt signal to the processor 101 via the interrupt bus 119.

Upon reception of the interrupt, the processor 101 can delete the unprocessed interrupt record in the selector 502, by using an I/O instruction.

Next, the booting process of the computer of this embodiment will be described.

The initial part of the booting process is written in ROM 118. ROM 118 is connected via the bus 109 to the processor 101 and mapped at a predetermined address of the physical address space of the processor 101. In the booting process, a hardware configuration is detected and a program for loading the OS kernel is loaded in the main memory 102.

When the processor 101 is reset, the processor 101 passes the control to a predetermined physical address. ROM 118 stores the program to be executed at this time. ROM 118 is mapped to the physical address space so that when the processor 101 is reset, the control is passed to this program.

The program stored in ROM 118 loads a first OS kernel loader stored in the magnetic disk 112 into the main memory 102, and executes it. The kernel loader is stored in the main memory 102 at a predetermined location, so that the program stored in the ROM 118 can easily locate this loader.

Figure 6:
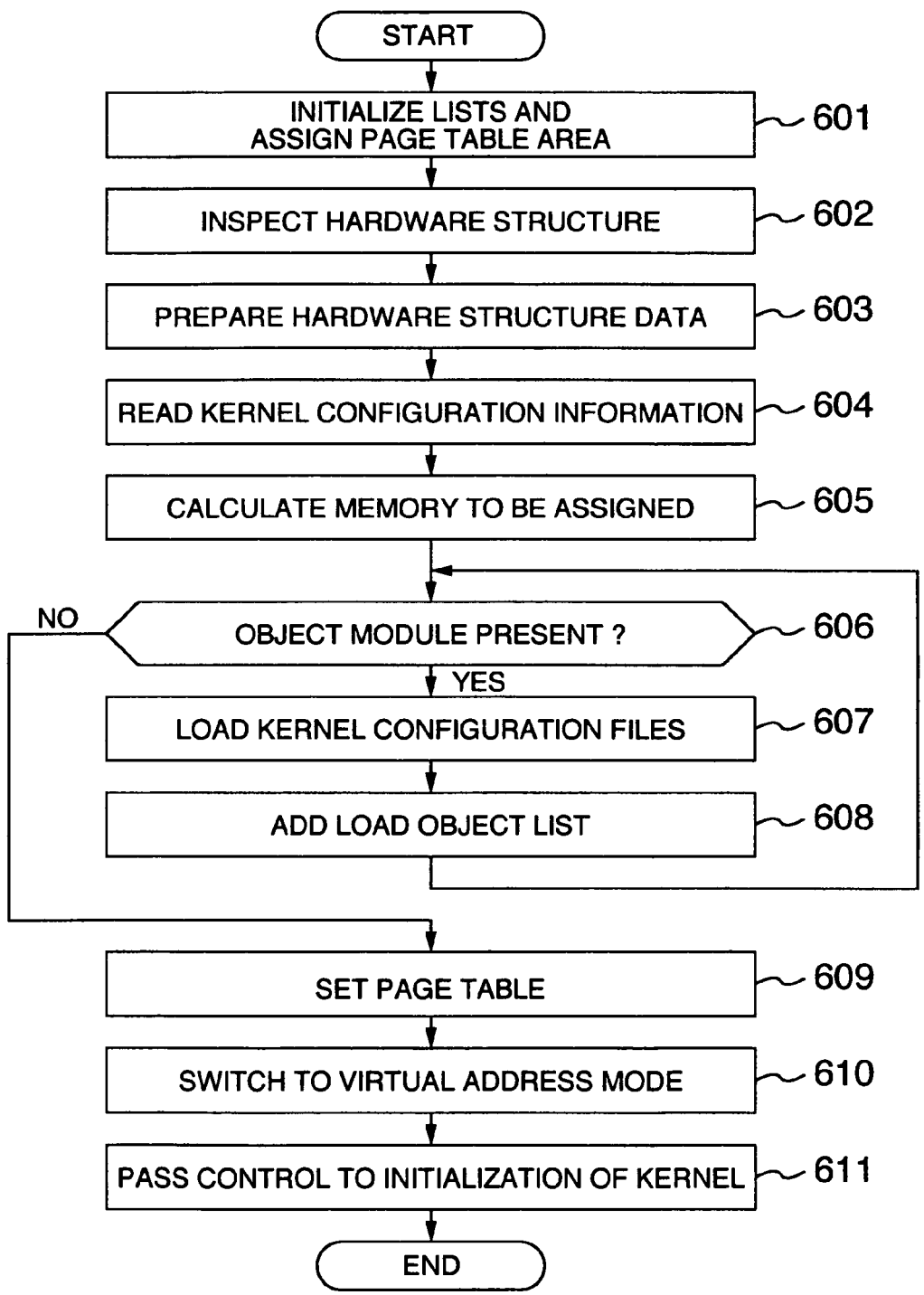
FIG. 6 is a flow chart showing a booting processing procedure of the computer.

FIG. 6 is a flow chart showing a processing procedure to be executed by the kernel loader of the operating system of the embodiment.

The kernel loader is configured so that it can understand the file system structure of the operating system, identify a location of a file from a file name and read it into the main memory.

The kernel loader first initializes a main memory list 801, a load module list 804 and a device list 802 delivered to the kernel as parameters and assigns a page table area for the kernel (Step 601).

The main memory list 801 has a data structure indicating the usage state of the main memory 102 and when the kernel loader assigns the physical memory in the following processing, the kernel loader performs the assignment by referring to the main memory list and modifying it.

Next, the hardware structure of the kernel is examined (Step 602) and the hardware structure data is prepared (Step 603). In Step 602, which hardware devices are connected to the computer 101 is examined by the hardware. In the subsequent Step 603, the device list 802 which is a data structure regarding the hardware structure is prepared on the basis of the result of Step 602. The kernel of the operating system performs the kernel initialization with reference to the device list 802.

Configuration information 700 of the operating system is read from the magnetic disk device 112 and an address for configuration information is set in a parameter table 810 (Step 604). The kernel of the operating system may be configured by a plurality of files such as files of the kernel itself and other device drivers. The configuration information 700 is stored in the magnetic disk device 112 by a predetermined file name and the load program can detect it.

The data structure of the kernel configuration information in the embodiment is shown in FIG. 7.

The kernel configuration information 700 includes data referred by the kernel loader and the operating system. The data is named and a program can acquire data corresponding to the name from the name. In the example shown in FIG. 7, there is an entry 701 named a memory size and data indicative of a memory size is stored as the contents of the entry 701. Further, an entry 705 named a secondary OS stores data for the second OS.

After the kernel configuration information 700 is read, the kernel loader decides a physical memory size assigned to the first OS in accordance with a data value stored in the memory size 701 of the kernel configuration information 700 (Step 605). All of kernel configuration files set in an object file 703 are loaded in the main memory 102 and an entry is added to the load module list 804 (Steps 606 to 608). In this example, object files having file names of kernel, driver 1, and driver 2 are loaded.

Next, the page table for the kernel corresponding to the memory size calculated at Step 605 is set (Step 609). An address of the page table set at Step 609 is set in the page table register 105 and the processor is switched to the virtual address mode (Step 610), so that the control is passed to the initialization routine of the kernel while the parameter table 810 including a set of the configured main memory list 801, device list 802, kernel configuration information table 803 and load object list 804 is used as parameters (Step 611). The entry point of the kernel is recorded in the data within the kernel file.

Figure 8:
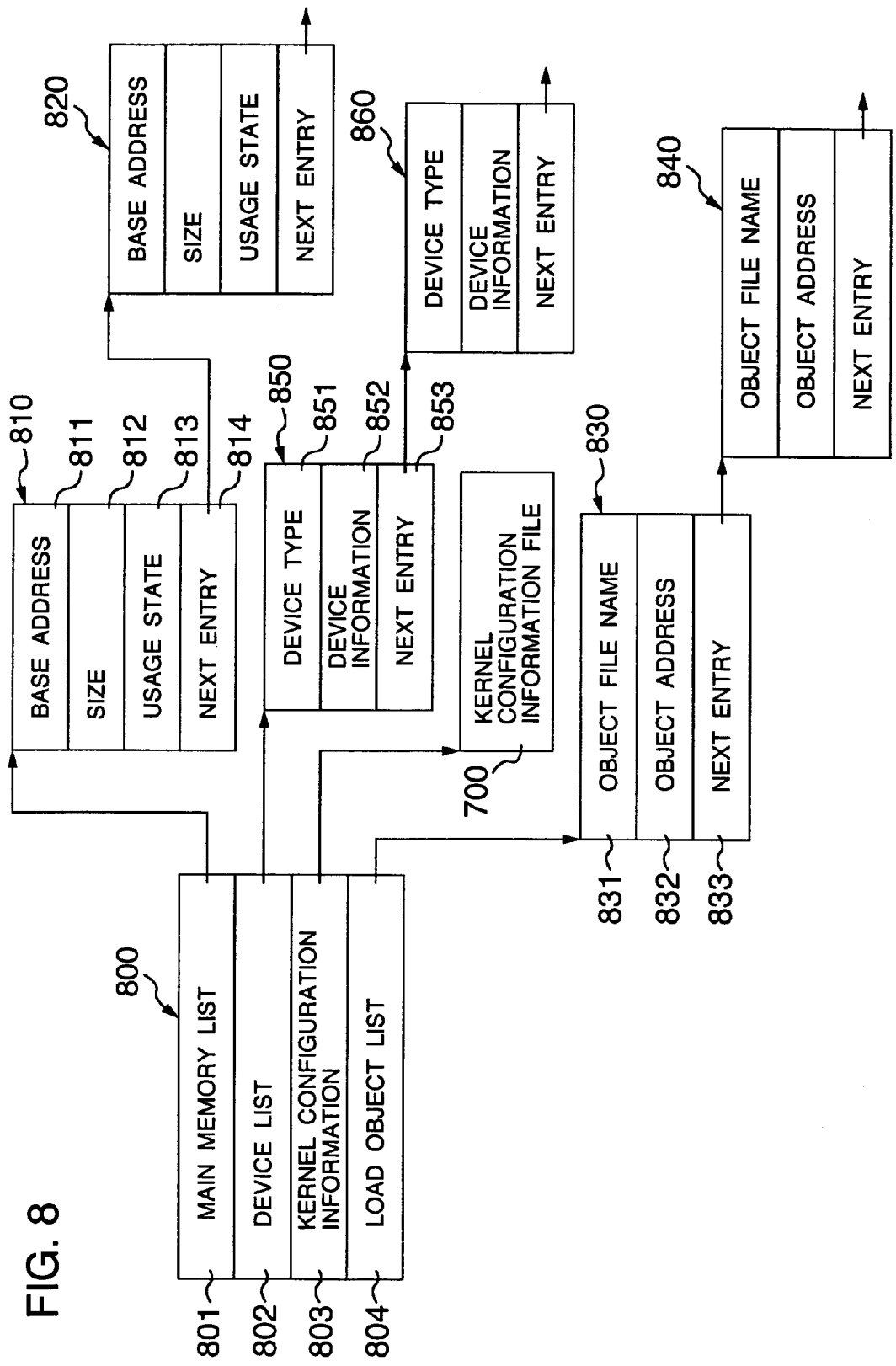
FIG. 8 shows a data structure of kernel start parameter.

Next, the hardware configuration data and load object data generated by the booting process starting at Step 601 shown in FIG. 6 will be described. FIG. 8 is a diagram showing the structure of the hardware configuration data and load object data.

Referring to FIG. 8, the parameter data 800 has the data structure generated by the kernel loader. Three lists starting from the parameter list 800 can be accessed by the kernel because they are located in the virtual space of the kernel which the loader configures.

The parameter table 800 has pointers to the starts of three lists configured by the loader and a pointer to one table. The three lists are the main memory list 801, device list 802, and load object list 804. One table is a kernel configuration information table 803. Each of these will be described next.

The main memory list 801 is a list of main memory block descriptive data 810. The main memory block descriptive data 810 includes a base address 811, a block size 812, a block usage state 813, and a pointer 814 to the next main memory block descriptive data.

The main memory block descriptive data stores a usage state of a continuous main memory area. The base address 811 indicates a physical start address of the continuous memory area, and the block size 812 stores the size of the continuous area. The block usage state 813 stores a value representative of whether the continuous area is not used or already allocated by the loader. These three sets of data and the next entry pointer 814 constitute the list. In the example shown in FIG. 8, the next entry is a list 820. By referring to the main memory list 801, the usage state of the physical memory can be known.

The device list 802 stores data regarding the hardware devices and generated by the kernel loader at Step 603. The device list 803 is a list of device data 850. The device data 850 includes a device type 851, device information 852, and a pointer 853 to the next device list.

The device type 851 stores a value representative of the type of a device described in the device data entry 850. The device information 852 stores data specific to the device type. For example, the interrupt number, I/O address or the like is stored. The next entry pointer 853 and the above data constitute the device list.

A pointer 803 to the kernel configuration information table points the contents of the kernel configuration information file 700 read by the kernel loader into the main memory 102.

The load object list 804 stores data regarding the object file loaded by the kernel loader into the main memory, and is a list of load object data 830. The load object data 830 includes an object file name 831, an object address 832, and a pointer 833 to the next load object list.

The object file name 831 stores a file name of the object file described in the load object data 830. The object address 832 stores an address of the kernel space where the header field of the subject object file is loaded. The next entry pointer 833 and the above data constitute the load object list.

The load object list 804 is generated at the same time when the kernel loader reads the object file constituting the kernel (Step 608).

Loading of Device Driver

A device driver is software for controlling a hardware device connected to the computer 100 and it is assumed that the device driver can be loaded during the initialization of the kernel of the operating system described in FIG. 6 or after the operating system has been started.

The procedure of incorporating the multi-OS management program 204 including the interrupt management program into the first OS as the device driver after the first OS is started is now described.

Figures 9A, 9B:
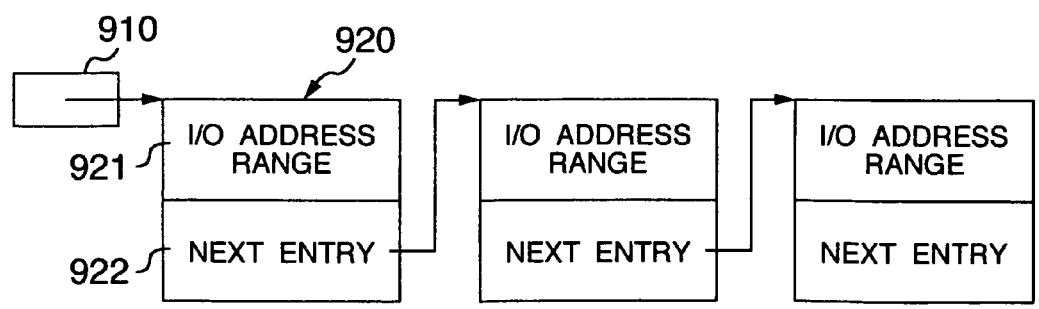
FIGS. 9A and 9B show data structures of a device management table of the first OS.

A device management table is first described. FIGS. 9A and 9B show structures of the device management table of the first OS. The device management table has two data structures including an interrupt management table 900 and an I/O address management list 910.

The interrupt management table 900 shown in FIG. 9A stores therein interrupt numbers to be received by the processor 101 and value or information indicative of whether each of the interrupt numbers is utilized by the first OS. When the device driver requires an interrupt number upon loading thereof, the kernel examines the table 900 and gives the right for using the required interrupt number to the device driver only when the interrupt number is not used. When it is described in the table that the interrupt number is already in use, the hardware device cannot be utilized by the first OS. For example, in the case of the interrupt number 3, data 902 corresponding to the number 3 holds the value indicating that the number 3 is already assigned or not in use.

The I/O address management list 910 is also the same. The I/O address management list 910 includes entries 920 representing I/O addresses. Each entry 920 includes an I/O address 921 utilized by the first OS and a pointer 922 to a next entry for configuring the list. Similarly to the interrupt management table 900, when the device driver requires an I/O address range, the kernel examines whether the address range is already utilized or not from the I/O address management list 910. When the address range is not used, the kernel adds an entry to the list 910 and gives permission of utilization to the device driver.

Figure 10:
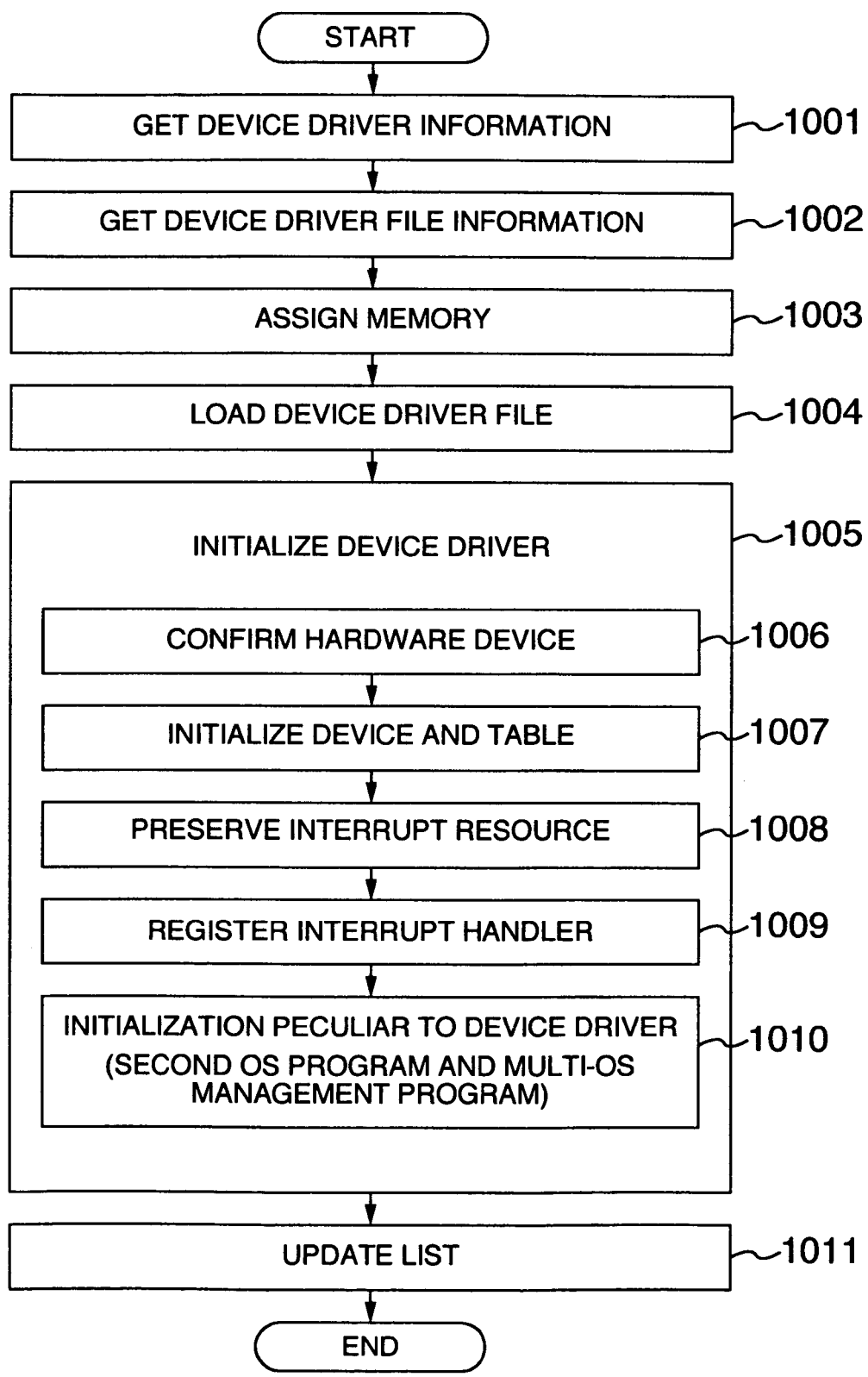
FIG. 10 is a flow chart showing a loading processing procedure of a device driver of the operating system.

FIG. 10 is a flow chart showing a loading processing procedure of the device driver executed by the first OS already started.

In the loading processing of the device driver, information of the device driver is first obtained (Step 1001). The information of the device driver is the object file name of the device driver. When the device driver is loaded upon initialization of the kernel of the operating system, the object file name is obtained from the entry name object file 703 of the kernel configuration information file 700 and when the device driver is loaded after the kernel is started, the object file name which is instructed to be loaded by the operator is used.

Next, the designated object file is examined and a memory size required to load the object is examined (Step 1002). A memory area on the main memory 102 required for the examined memory size is requested to the operating system (Step 1003) and the device driver is loaded in the memory area (Step 1004).

An entry point for the initialization of the device driver is acquired from the object file of the device driver to perform the initialization of the device driver (Step 1005). In the initialization of Step 1005, by referring to the device list 802, it is confirmed that the hardware device corresponding to the device driver is connected to the computer 100 (Step 1006).

When the hardware device is connected, initialization of the hardware device and the table required for processing of the device driver is performed (Step 1007). If the hardware device requires an interrupt number or an I/O address, the device driver notifies to the operating system that the device driver uses the interrupt number or the I/O address range. The operating system examines the interrupt management table 900 and the I/O address management list 910 of FIG. 9. When the required resource can be used, the operating system gives permission of usage to the device driver and updates the device driver management table to set so that other device drivers cannot use this resource (Step 1008). When the usage permission of the interrupt number is obtained, the address of the interrupt handler processing for processing the interrupt is registered to the operating system (Step 1009). Processing peculiar to the device driver is executed if necessary (Step 1010). In the embodiment, the multi-OS management program including the interrupt management program is incorporated into the first OS in the form of a device driver.

In the loading of the device driver, when the processing from Steps 1001 to 1009 is all performed exactly, the object file information of the device driver is added to the load object list 804 (Step 1011) and the device driver is operated while the device driver constitutes a part of the operating system so that the device driver controls the hardware device.

Figure 11:
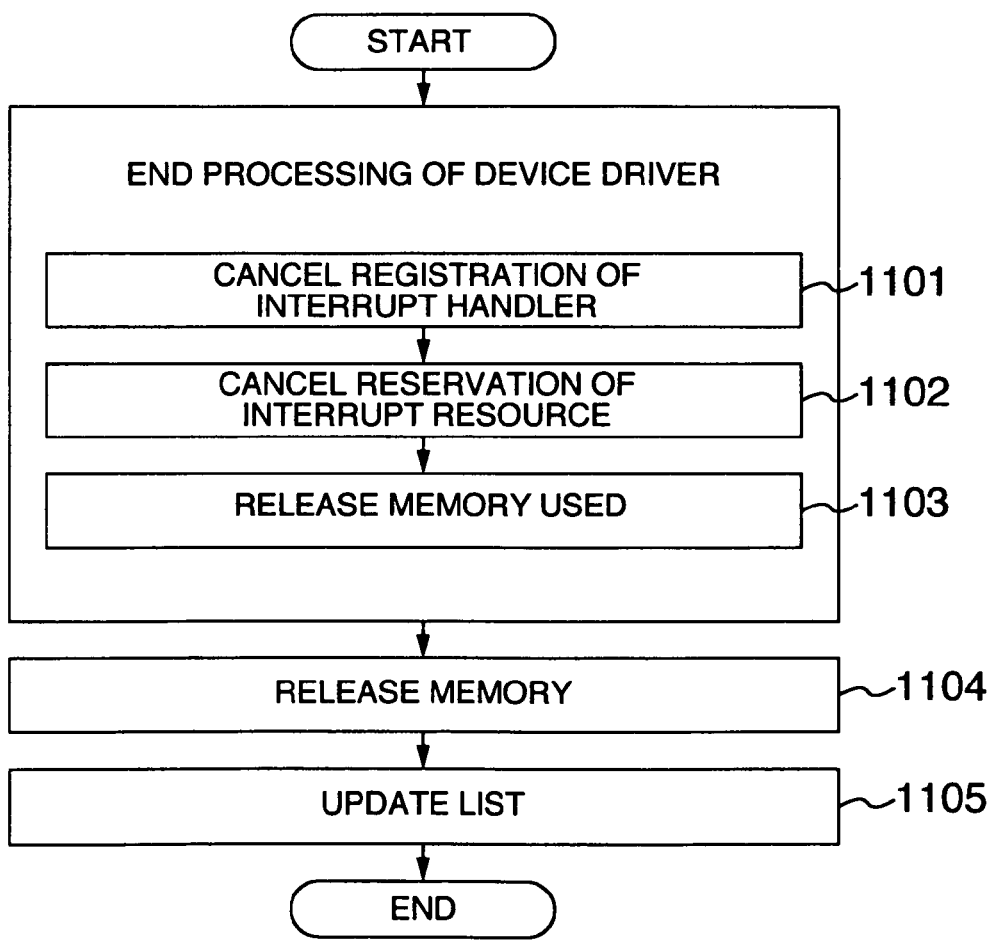
FIG. 11 is a flow chart showing an unloading processing procedure of the device driver of the operating system.

FIG. 11 is a flow chart showing unloading processing of the device driver.

The unloading of the device driver is to be performed to stop usage of the hardware device and is performed when the loaded device driver is unloaded in accordance with an instruction or when the hardware device is removed from the computer after the operating system is started.

In the unloading of the device driver, the end processing of the device driver is first called by the operating system (Step 1101).

In the end processing of the device driver, registration of the interrupt handler and usage of the interrupt number or I/O address range used are canceled (Steps 1102 and 1103). The canceled interrupt number or I/O address range is in the unused state and can be utilized by other device drivers. Then, the memory used by the device driver is released (Step 1104) and the end processing of the device driver is completed.

After the end processing of the device driver, the memory area in the main memory 102 in which the object file of the device driver is loaded is released (Step 1104) and the object file of the device driver is deleted from the load object list 804 (Step 1105).

Incorporation of Multi-OS Driver

Processing procedure for running a plurality of operating systems on a single PC is now described. In the embodiment, the control for running the multi-OS is incorporated as a device driver for the first OS (hereinafter referred to as multi-OS driver).

Figure 12:
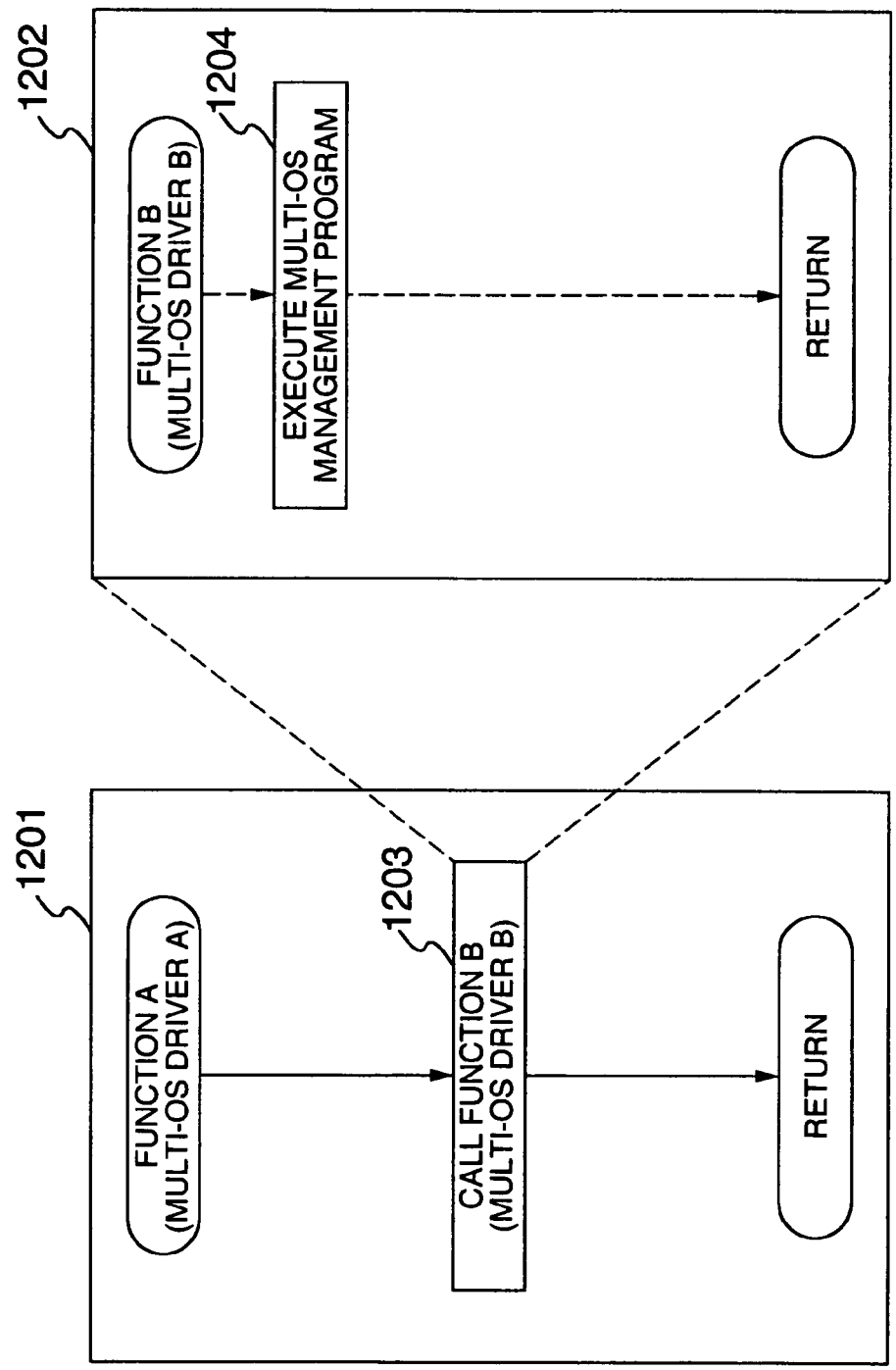
FIG. 12 shows a processing structure of a multi-OS driver.

FIG. 12 is shows a processing structure of the multi-OS driver.

The multi-OS driver is divided into two portions including an entrance function portion 1201 executed by calling from the operating system and an execution function portion 1202 executed by calling from the entrance function portion 1201.

All the entrance functions of the multi-OS driver hold addresses of the execution functions corresponding thereto, and when the entrance function is called by the operating system, the corresponding execution function is called (Step 1203) and the called execution function executes actual processing of the function. In the case of the multi-OS driver, the multi-OS management program is executed.

The reason why the multi-OS driver is divided into two portions is that after the operating system loads the device driver, the address of the execution function portion 1202 can be changed in order to allow any of the plurality of OSs to call the function by using the same virtual address.

Figure 13:
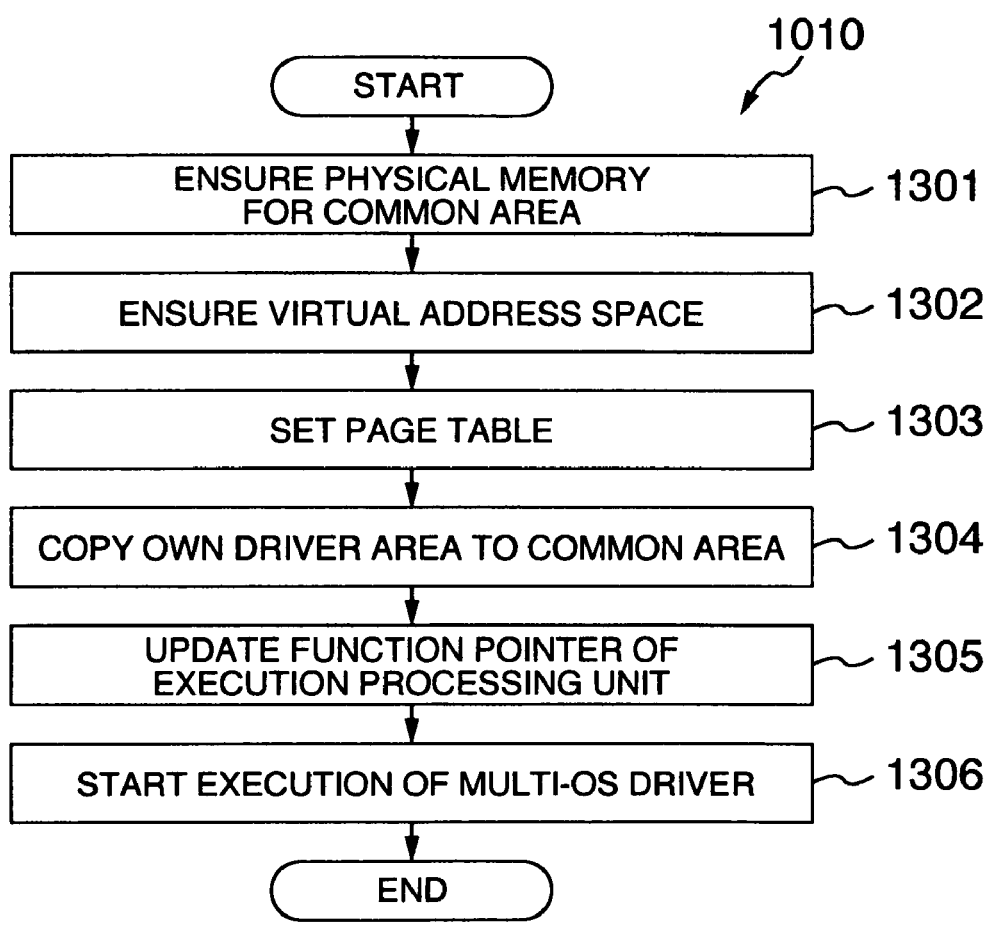
FIG. 13 is a flow chart showing a loading processing procedure of the multi-OS driver.

FIG. 13 is a flow chart showing loading processing procedure of the multi-OS driver. The multi-OS driver is also a kind of device driver and the first operating system loads the object file of the multi-OS driver in accordance with the flow chart shown in FIG. 10. Accordingly, FIG. 13 shows only the details of the processing peculiar to the device driver of the multi-OS driver (Step 1010 of FIG. 10).

In FIG. 13, the physical memory for common area to be referred from all the operating systems is ensured (Step 1301). The interrupt table 107, the interrupt management program, the interrupt handler, the interface module to be referred from each operating system and the like are stored in the common area as part of the multi-OS driver. The ensuring of the physical memory for the common area is made by ensuring an idle area with reference to the main memory list 801. In the embodiment, only the first OS is loaded in the physical memory and a memory having a larger address among the idle physical memory is ensured by a necessary capacity.

The virtual address space for the first OS is ensured for the common area (Step 1302). Since it is necessary that the virtual address space is made consistent in all the operating systems, it is assumed that the address previously decided in all the operating systems is assigned to the virtual address space. In the embodiment, the virtual address space is ensured from the address space having the largest address in the virtual address space for the first OS by a necessary capacity.

When the physical memory and the virtual address space are ensured, the page table for the first OS is set so that access can be made from the virtual address ensured at Step 1302 to the physical memory ensured at Step 1301 (Step 1303).

Next, the multi-OS driver copies the object and data in the area to which the first OS is loaded, to the common area (Step 1304) and the address of the execution function held by the entrance function called from the operating system, of the multi-OS driver functions described in FIG. 12 is updated to the address of the execution function copied to the common area (Step 1305). By updating the address of the execution function, the object of the execution function existing in the common area is executed when the function of the multi-OS driver is called from the first OS.

Figure 14:
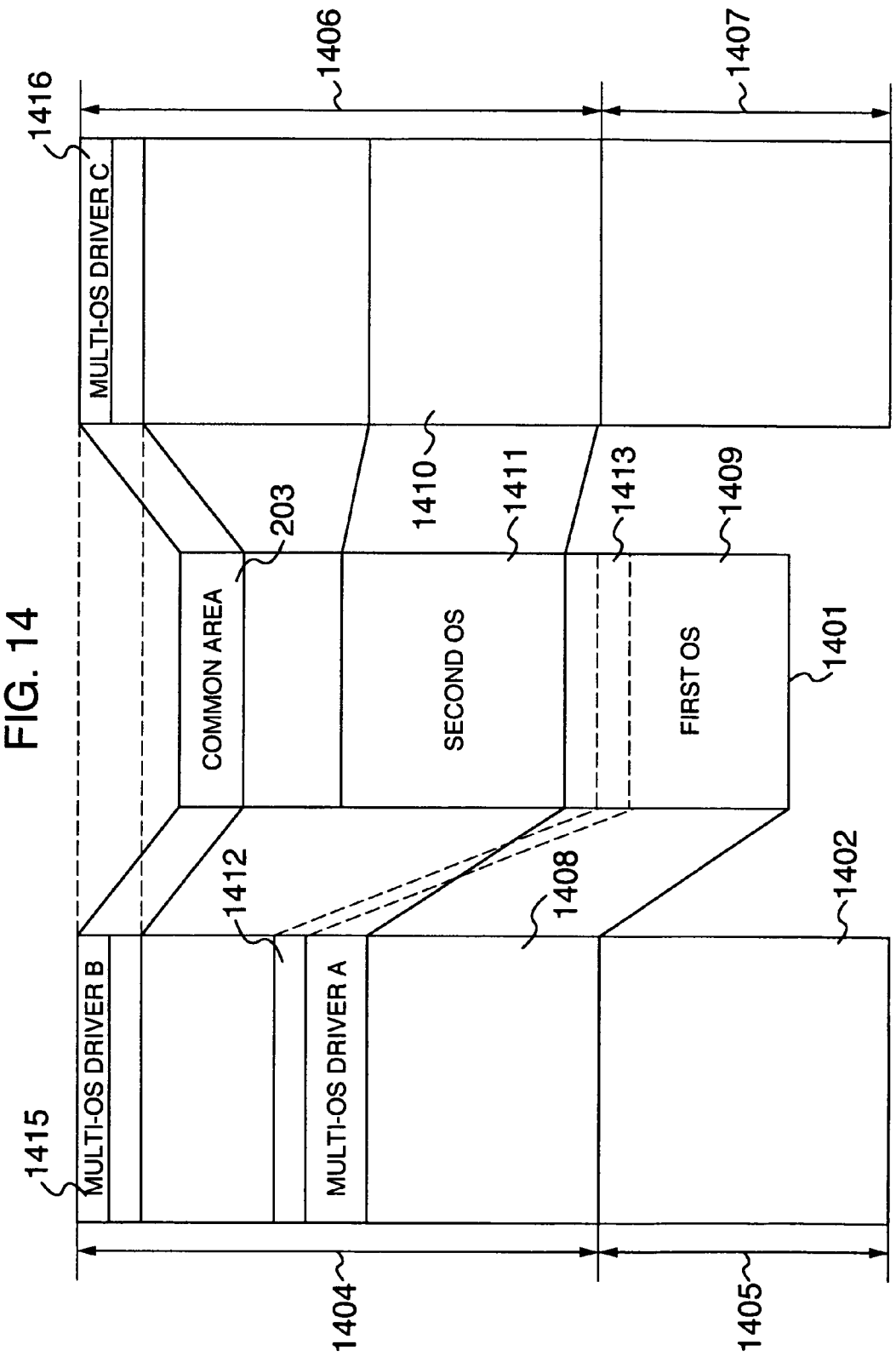
FIG. 14 shows correspondence of a virtual address space and a physical memory of a main memory 102.

FIG. 14 shows correspondence of the virtual address space and the physical memory of the main memory 102.

Numeral 1401 represents the physical memory 102 and 1402 the virtual address space for the first OS. It is assumed that addresses are increased from the lower portion to the upper portion in FIG. 14. The virtual address space 1402 for the first OS is divided into a kernel space 1404 accessible only by the first operating system and a user space 1405 accessible by the first operating system and the user program. It is shown that the page map table is set so that the lower address side portion 1408 of the kernel space 1404 can access to the memory 1409 assigned to the first OS of the physical memory 1401.

The multi-OS driver is loaded in an area 1413 which is a part of the physical memory 1409 by the first OS and mapped to a multi-OS driver A area 1412 of the virtual address space 1404. The multi-OS driver A area 1412 is changed in accordance with usage state of the virtual address space of the operating system and accordingly the multi-OS driver A area 1412 cannot be forecasted previously.

The multi-OS driver includes the object and data used by all the operating systems and accordingly the object and data must be moved to the virtual address space area (multi-OS driver B area 1415) which can be ensured by all the operating system and is consistent in all the operating system. Thus, all the operating system can access to the multi-OS driver by using the common address (refer to the virtual page numbers 998 to 1000 of FIGS. 3A and 3B). Further, the physical memory of the multi-OS driver B area 1415 is also moved from the area 1413 in the physical memory assigned to the first OS to the common area 203, so that erroneous memory access due to a defect of the operating system can be prevented.

Figure 15:
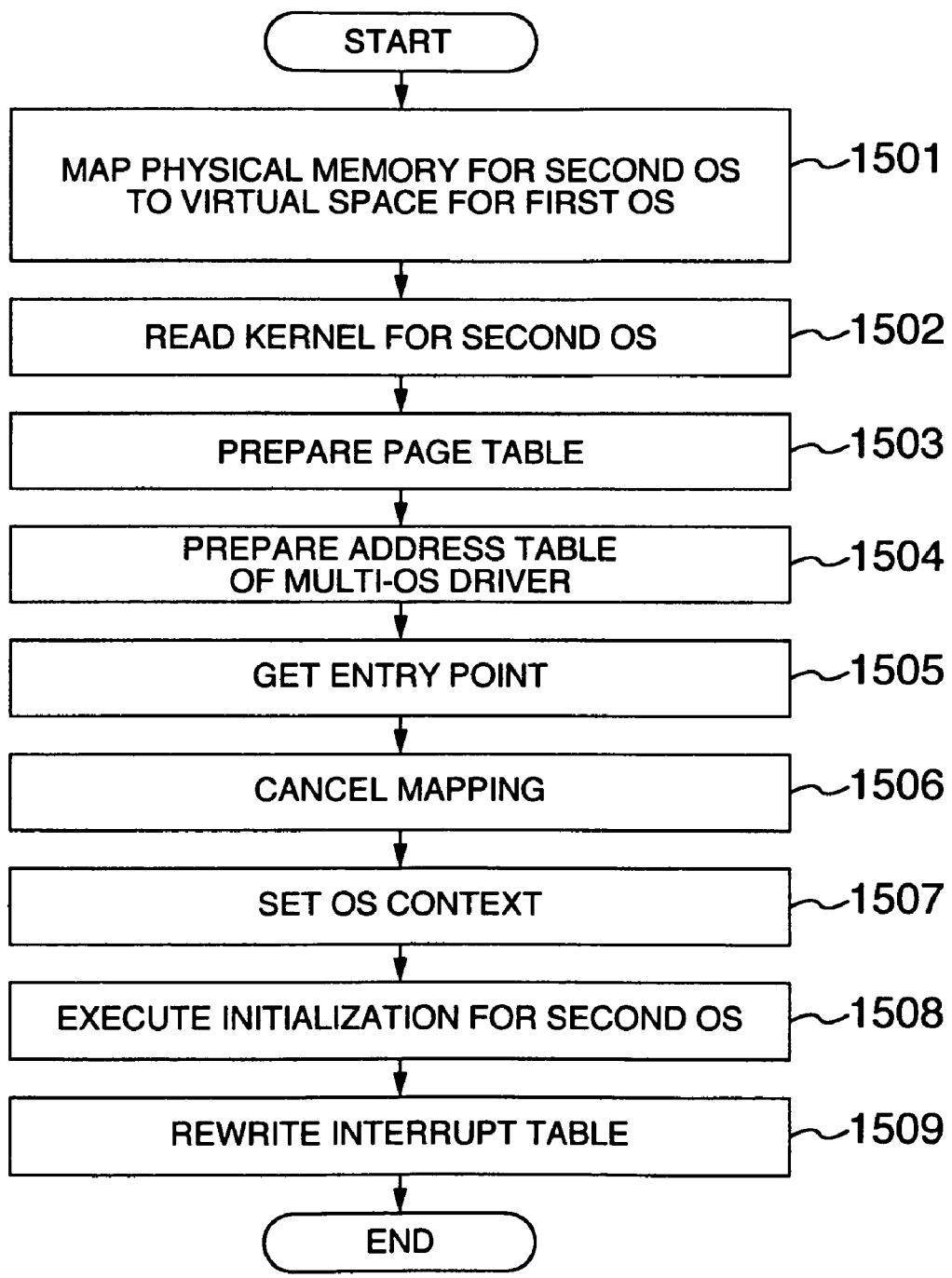
FIG. 15 is a flow chart showing a loading processing procedure of a second OS.

FIG. 15 is a flow chart showing a procedure for loading the second OS by execution of the multi-OS management program in the first OS after starting of the first OS.

In this processing, it is necessary to read the object file of the second OS into the physical memory area assigned to the second OS. Since writing to the physical memory area for the second OS cannot be made from the first OS as it is, the physical memory area assigned is mapped to the virtual space of the first OS temporarily (Step 1501).

At Step 1502, the object file for the second OS is read in the mapped area by utilizing the file reading procedure of the first OS.

Next, the page table for the second OS is prepared (Step 1503). This page table is also prepared in the area for the second OS. At this time, the page table is configured so that even the common area 203 can be referred from the space for the second OS.

A multi-OS driver C area 1416 for mapping the common area 203 is set to be the same value as the virtual address of the multi-OS driver B area 1415 for the first OS.

The address of the interface module is written in the area for the second OS so that the interface module of the multi-OS driver arranged in the multi-OS driver C area 1416 can be called from the second OS and is passed to the second OS as an argument at the start time (Step 1504). Similarly, the address of the function required when the second OS is called from the multi-OS driver is obtained from the object file and stored in the common area 203 (Step 1505).

Thus, the setting of the second OS area is completed and the mapping of the physical memory area for the second OS mapped to the first OS is canceled (Step 1506).

Next, a context for the second OS of an OS context table 1610 and an OS identification variable 1630 are set (Step 1507). The OS context has a data structure referred when the operating system being running is switched and includes a page table address value and an initial value of a stack pointer. In this example, the address of the page table for mapping the second OS is set as the page table register value and an initial address of a kernel stack for the second OS is set as the stack pointer value. A value indicating that the first OS is running is stored in the OS identification variable 1630. The OS context table 1610 and the OS identification variable 1630 will be described later.

The initialization module for the second OS is next executed (Step 1508). This execution is accompanied by switching of the operating system space. The switching of the operating system will be described with reference to another flow chart.

Finally, at Step 1509, the address of the interrupt handler for the first OS registered in the current interrupt table register 104 is copied to a handler column 1622 of an interrupt identification table 1620. The interrupt table register value is changed to the address of the interrupt table assigned to the multi-OS driver. This is performed by changing the interrupt table register 104 of the processor 101.

The reason that the interrupt table is changed to the table in the multi-OS driver is that the interrupt table must be always in the virtual address space of the processor 101 even if any operating system runs upon 1, occurrence of interrupt. The interrupt handler registered in the interrupt table is also arranged in the multi-OS driver. The area of the multi-OS driver can be always referred since it is mapped even to the virtual space for the second OS to be the common area 203 at Step 1503. The interrupt processing of the multi-OS driver will be described later.

Figure 16:
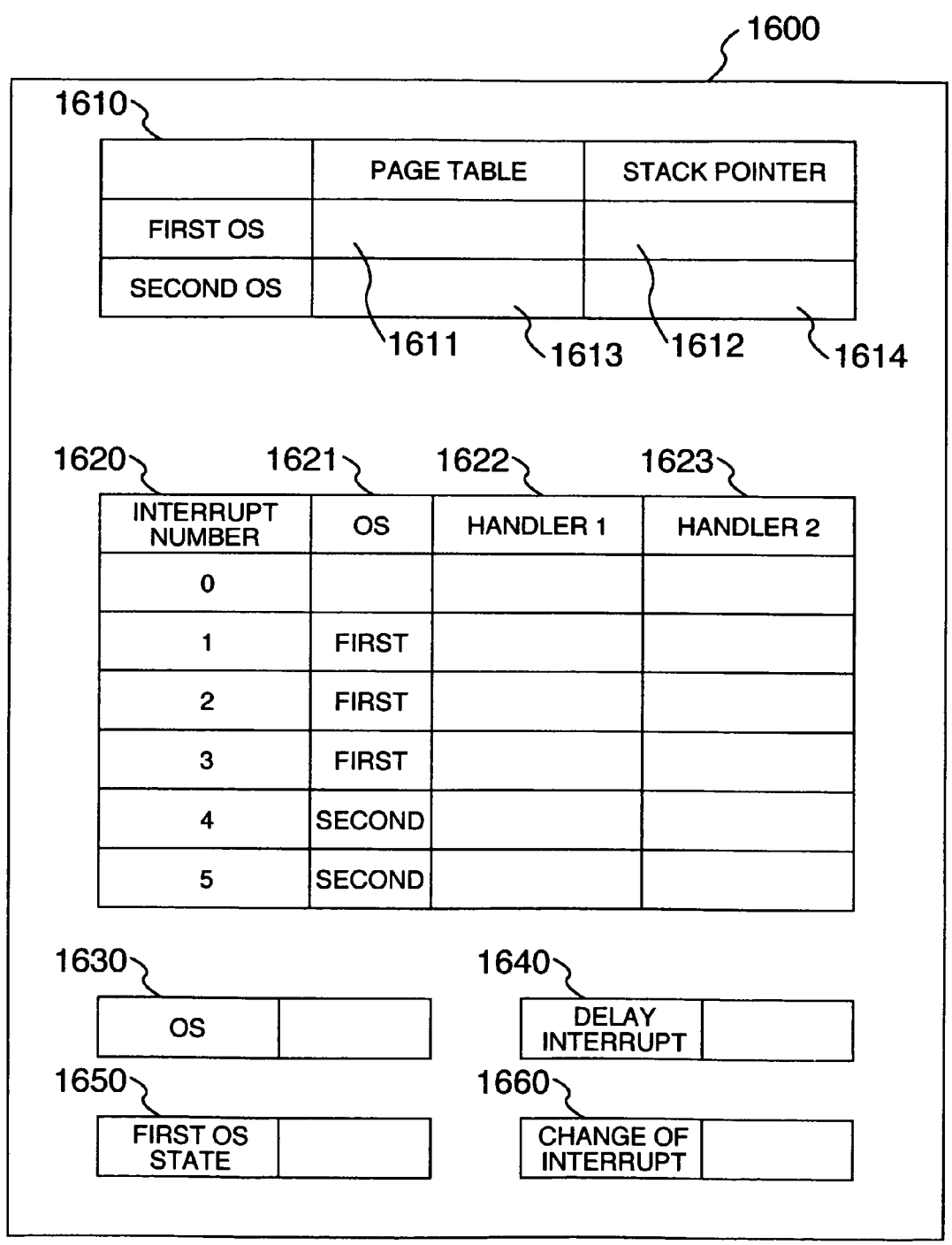
FIG. 16 shows a data structure shared by the first and second OSs.

FIG. 16 is a diagram showing a data structure of data stored in a data area 1600 of the common area 203.

Numeral 1610 represents the OS context table. The OS context table 1610 stores therein data necessary for switching the first OS and the second OS. In the embodiment, it is assumed that the first OS can run only when the second OS is idle. In this case, the first OS is switched to the second OS at a time that the first OS is running and the control is returned to the first OS when execution of the second OS is completed.

Accordingly, only one set of context is required unless it is not stored in each OS. When the page table register value 1611 at the time that the OS switching is required and the stack pointer value 1612 are stored for the context of the first OS, the control can be recovered to the first OS after execution of the second OS is completed.

When the control is switched from the first OS to the second OS, the second OS is not running. Accordingly, the page table address and the stack pointer for the context of the second OS may be also fixed address. The page table register 1613 and the stack pointer value 1614 for the second OS are set when the second OS is loaded (Step 1507).

Numeral 1620 represents an interrupt identification table. The interrupt identification table 1620 stores therein a value 1621 indicating which operating system processes an interrupt and an address 1622 for the interrupt handler for each interrupt number of external interrupts. When an external interrupt occurs, the interrupt handler in the common area 203 captures the interrupt and decides an operating system to process the interrupt with reference to the processing OS 1621 of the interrupt identification table 1620. Then, the control is passed to the address of the handler 1622. The interrupt processing will be described later in detail.

Numeral 1630 represents an OS identification variable storing a value indicative of the running operating system. The OS identification variable 1630 is set each time OS is switched in the OS switching procedure starting from Step 1701. In the interrupt processing, the interrupt processing procedure is decided with reference to the OS identification variable 1630.

Numeral 1640 represents a delay interrupt state variable indicating whether an interrupt from a device managed by the first OS occurs during execution of the second OS. The delay interrupt state variable 1640 stores an interrupt number of an interrupt occurred. The OS switching procedure examines the delay interrupt state variable 1640 when execution of the second OS is completed and decides whether the interrupt processing is started (Step 1708).

Numeral 1660 represents a variable indicating that the device driver operating on the second OS requests to use or cancel using the resource of the interrupt number or the I/O address range. When a resource is required during execution of the second OS, it is necessary to notify to the first OS that the first OS must not use this resource, while the second OS cannot call processing of the first OS directly. Accordingly, the multi-OS driver receives the request of the resource from the second OS and sets a provisionally reserved state. When execution of the second OS is completed, the variable 1660 is examined, so that the multi-OS driver requires the resource to the first OS again. Since the first OS is necessarily in the stop state during execution of the second OS, the first OS cannot use the resource even when the resource is in the provisionally reserved state by the multi-OS driver.

FIG. 17 is a flow chart showing a switching procedure of the operating system in the embodiment of the present invention. This switching procedure is called during execution of the first OS and performs switching to the second OS.

The procedure shown in FIG. 17 receives the address of the second OS module executed after switching from the first OS to the second OS and an argument delivered to the module as argument. The address of the second OS module is assumed to be acquired at Step 1505.

First, at Step 1701, a current stack pointer value and page table register value are stored as the first OS context of the OS context table 1610. At Step 1701, the current stack pointer value is stored in the stack pointer 1612 and the current page table register value is stored in 1611. Other register context is not required to be stored in the OS context table 1610. If necessary, it may be stored in the first OS stack.

After the stack pointer value and the page table register value are stored, the address of the page table for mapping the second OS to the virtual space is set in the page table register 105 at Step 1702. This is stored in 1613 of the OS context table 1610. Further, the stack pointer is set in the second OS. This is also stored in the stack pointer 1614 for the second OS of the table 1610.

At next Step 1703, the delay interrupt state variable 1640 indicative of the interrupt state of the first OS and the request variable 1660 of the interrupt resource are cleared and the contents of the interrupt management table 900 and the I/O address management list 910 are copied to the common area 203. The OS identification variable 1630 indicative of the current executing OS is rewritten to a value indicative of the second OS (Step 1704). Since the stack pointer, the page table register 105 and the OS identification variable 1630 must have always the consistent values, the Steps 1701 to 1704 must be executed in the state that all of external interrupts are prohibited.

At subsequent Step 1705, the control proceeds to the address of the module delivered as the argument and the control is passed to the second OS. In the embodiment, the first OS passes the control to Step 1706, when the second OS does not run, that is, when processing of the second OS is completed.

At Step 1706, the page table register value 1611 and the stack pointer value 1612 stored in the OS context table 1610 at Step 1701 are recovered. At subsequent Step 1707, the OS identification value 1630 is changed to the value indicating that the first OS is running. The processing at these two Steps must be performed in the prohibited state of interrupt.

Next, the external interrupt of the device occurred during execution of the second OS and managed by the first OS is processed. At Step 1708, whether an interrupt occurs or not is examined on the basis of the delay interrupt state variable 1640. When any interrupt does not occur, Step 1711 is executed. When an interrupt occurs, Step 1709 is executed. At this Step, the interrupt occurring during execution of the second OS is stored in the delayed interrupt state variable managed by the second OS as the interrupt still not processed. Then, the interrupt processing for the first OS is started (Step 1710). When all the interrupt processings are completed, Step 1711 is executed.

At Step 1711, it is examined whether there is any change in the usage state of resources of the interrupt number or I/O address range required by the hardware device due to loading or unloading of the device driver during execution of the second OS or not. That is, in order to control the hardware device used by the second OS in accordance with the processing procedure described in FIG. 10 during execution of the second OS, when the corresponding device driver is loaded and a usage request of the resource is notified from the device driver to the second OS, the second OS notifies the multi-OS driver that usage of the resource is required. The notified multi-OS driver examines the interrupt management table 900 and the I/O address management list 910 copied in the common area 203 at Step 1703 and when it is possible to use the resource, the table (900 and 901) for the common area 203 is updated and then permission of the usage of the resource is issued. At the same time, the information that the state of the usage of the resource is changed is stored in the variable 1660. It is the same as the case where unloading of the device driver is made during execution of the second OS. The request is passed from the device driver to the second OS and is further passed from the second OS to the multi-OS driver. The change is stored in the variable 1660.

At Step 1711, the variable 1660 is examined to thereby detect that the usage state of resources of the interrupt number or the I/O address range is changed. When there is any change, the contents of the interrupt management table 900 and the I/O address management list 910 in the common area 203 are written into the interrupt management table 900 and the I/O address management list 900 managed by the first OS (Step 1712).

Thus, since the resource of the hardware device used by the second OS is also set to the first OS, it is prevented that this resource is assigned to the device driver of the first OS. The resource of the hardware device used by the second OS is shown as the resource used by the multi-OS driver loaded in the first OS as viewed from the first OS to thereby keep the consistency of management in the operating system.

FIG. 18 is a flow chart showing the interrupt processing procedure of the embodiment. The module for executing this procedure is registered in the interrupt table 107 of the processor 101 as the interrupt handler. Further, the interrupt handler is arranged in the common area 203 accessible from any operating system.

When an external interrupt occurs and the interrupt handler is started by the processor 101, the interrupt handler examines an interrupt factor to judge whether the hardware occurring the interrupt is the hardware device to which the first OS is related or the hardware device managed by the second OS (Step 1801). This judgment is performed by referring to the OS column 1621 while the interrupt number of the interrupt identification table 1620 is used as an index. When it is the hardware device for the first OS, the process proceeds to Step 1802 and when it is the hardware device for the second OS, the process proceeds to Step 1805. For example, in FIG. 16, when the interrupt number is "1", the interrupt is that for the first OS and when the interrupt number is "4", the interrupt is that for the second OS.

When the interrupt is that of the hardware device for the first OS, Step 1802 is executed. In Step 1802, the operating system running upon occurrence of the interrupt is judged. This judgment is performed by referring to the OS identification variable 1630. When the running OS is the first OS, the process proceeds to Step 1803 and when it is the second OS, the process proceeds to Step 1804.

The processing starting from Step 1803 is the processing in case where the hardware device managed by the first OS produces the interrupt during execution of the first OS.

At Step 1803, the context is set as if the processing starting from Step 1801 is not present and the interrupt handler of the first OS appears to be controlled from the processor 101 directly. The context means the contents of the stack and/or register. The address of the interrupt handler of the first OS is stored in the handler column 1622 of the interrupt identification table 1620. For example, when the interrupt is that of the interrupt number 1, the interrupt identification table is referred while setting 1 as an index to thereby obtain the address of the handler. In this case, the control is not returned to the procedure starting from Step 1801 and the first OS continues the processing.

When the hardware device managed by the first OS produces an interrupt during execution of the second OS, Step 1804 is executed. At Step 1804, the interrupt number of the hardware device occurring the interrupt is stored in the delay interrupt state variable 1640. The processing of the interrupt handler is completed as described above. The interrupt processing in this case is performed when the running OS is switched to the first OS (Step 1708).

When the external interrupt occurred is that of the hardware device managed by the second OS, the process proceeds to Step 1805 and it is examined which OS is running. Even in this case, the running OS is judged in accordance with the OS identification variable 1630. When the first OS is running, the process proceeds to Step 1806 and when the second OS is running, the process proceeds to Step 1811.

When the interrupt of the hardware device managed by the second OS is produced during execution of the second OS, Step 1811 is executed. At Step 1811, the interrupt handler of the second OS is started. The address of the interrupt handler of the second OS is stored in the handler column 1622 of the interrupt identification table 1620. When the interrupt handler processing of the second OS is completed and returned, the interrupt handler is also ended and the context upon the interrupt is recovered to return the control.

When the external interrupt of the hardware device managed by the second OS is produced during execution of the first OS, Step 1806 is executed. In this case, the processing of the second OS is performed with a priority over execution of the first OS.

First, at Step 1806, the context is stored. The context means the contents of the stack and register required to recover the state upon interrupt when the control is returned to the first OS after the interrupt processing is completed. The context is stored in the stack of the kernel of the first OS.

Subsequently, switching of the running OS and starting of the interrupt processing of the second OS are performed (steps 1807 and 1808). This is performed from the procedure starting from Step 1701.

When the processing of the second OS is completed, switching to the first OS is performed (step 1809) and the context upon interrupt is recovered (Step 1810), so that the processing of the first OS is resumed. The processing at Step 1809 is not necessarily required to be performed by the same module as the processing starting from the Step 1801. The processing is returned to this module by switching to the first OS.

The clock interrupt processing shared by two operating systems is now described.

The clock interrupt is captured by the interrupt handler in the common area 203. In this interrupt handler, the interrupt handler for the clock interrupt of the second OS is first executed. The interrupt handler of the second OS is stored in the handler column 1623. When the interrupt handler of the second OS is completed, the interrupt processing of the first OS is performed by the processing starting from Step 1802 of FIG. 18. The address of the interrupt handler of the first OS is stored in the handler column 1622.

As described above, two operating systems can run on the single computer simultaneously.

Further, in the above embodiment, by adding Step 1510 as shown in the flow chart of FIG. 19 to the loading procedure of the second OS shown in FIG. 15, the operating state of the first OS can be monitored by the second OS. The processing procedure of FIG. 19 is now described.

Steps 1501 to 1509 of the processing procedure of FIG. 19 are the same as those of the flow chart of FIG. 15 and Step 1510 is added to perform new monitoring processing.

When the operating system judges that a failure occurs during execution thereof and the processing cannot be continued, an error processing function of the operating system is executed to thereby stop all the hardware devices connected to the computer and finally stop the processor of the computer. In the embodiment, since the plurality of operating systems run on the single computer, it is not necessarily required to stop the whole computer due to a failure occurred in one operating system and the operating system other than that having the failure occurred therein can continue operation of the computer.

In the embodiment, it is assumed that a failure occurs in the first OS and the second OS detects it. At Step 1510, an instruction at the head of the error processing function called by the first OS is rewritten by the instruction for producing interrupt in the end of the loading processing of the second OS. For example, when there occurs a failure that the first OS cannot continue running in case where the instruction for producing the interrupt number 5 is written in the state of the interrupt identification table 1620 shown in FIG. 16, the interrupt number 5 occurs in the processor 101 before the error processing function of the first OS is executed. The interrupt number 5 is the interrupt managed by the second OS, and the handler of the second OS is called in accordance with the contents of the handler column 1623 of the interrupt number 5. That is, before the error processing function of the first OS is executed, the second OS can detect occurrence of the failure in the first OS. By notifying the multi-OS driver that the first OS fails by the interrupt handler processing of the interrupt number 5 and thereafter running only the second OS, the processing of the second OS can be continued. The second OS continuing the operation can perform diagnosis and recovery of the failure of the first OS and notify it to the operator. Thus, in the environment that the plurality of operating systems run on the single computer simultaneously, there can realize the system in which one operating system monitors a failure occurring in other operating systems.

In the embodiment, the function of running the plurality of operating systems on the single computer is realized by the device driver constituting the multi-OS driver, while the function of implementing the multi-OS can be incorporated in the operating system loaded by the booting processing of the computer. In the embodiment, by performing the processing (steps 1301 to 1306) of implementing the multi-OS shown in FIG. 13 in the processing of Step 611 for the booting processing of FIG. 6, loading of the second OS is possible when the first OS is started. In this embodiment, the processing procedures shown in FIGS. 15 to 19 are not required to be modified. Thus, the operating system in which operating systems other than the own operating system can run on a single computer simultaneously can be realized and the plurality of operating systems can run simultaneously.

What is claimed is:

1. A computer system comprising:
   a plurality of hardware devices:
   a first operating system (OS) assigned with a first hardware resource of said hardware devices;
   a second OS assigned with a second hardware resource of said hardware devices exclusively when said first OS is set up, wherein said first and second OSs are executed independently of each other by a single processor;
   a multi-OS driver activated as a device driver stored in a common area of a virtual memory used by said first and second OSs, said multi-OS driver accepting interrupts from said single processor, wherein said multi-OS driver executes independently of operation of said first and second OSs, the multi-OS driver indicating an execution of an interrupt to one of said first and second OSs based on interrupts accepted; and
   one of said first and second OSs runs independently of the other of said first and second OSs without hardware and software for a privilege instruction to be executed by each of said first and second OSs;
   wherein the multi-OS driver manages rights of using the hardware devices by the first and second OS,
   and manages notification destinations of interrupts from the plurality of hardware devices to the first and second OSs,
   when the first OS uses a first hardware device of the plurality of hardware devices, the first OS notifies the multi-OS driver of a request for use of the first hardware device,
   the multi-OS driver notifies the first OS of permission for using the first hardware device, if a notification destination of interrupts to an OS received from the first hardware device is not registered as "the second OS", and
   notifies the first OS of an interrupt from the first hardware device, when receiving the interrupt from the first hardware device after the notification of permission.

2. The computer system according to claim 1, wherein, when the first OS terminates use of the first hardware device, the first OS notifies the multi-OS driver of termination of using the first hardware device, and the multi-OS driver deletes information, namely "the first OS", from a registered notification destination of interrupts to be received from the first hardware device.

3. The computer system according to claim 2, wherein the multi-OS driver has a management table for managing the notification destinations of interrupts from the plurality of hardware devices.

4. The computer system according to claim 3, further comprising a memory, and
   wherein the multi-OS driver is stored in the memory in an area accessed by the first and second OSs.

5. The computer system according to claim 4, wherein the multi-OS driver is mapped in the memory in such a manner that the multi-OS driver is located in a same address area in both memory space of the first OS and memory space of the second OS.

6. The computer system according to claim 5, wherein, when the first OS loads the multi-OS driver in the memory, the first OS maps the multi-OS driver at an arbitrary address area in the memory space of the first OS, and thereafter, alters mapping in such a manner that the multi-OS driver thus mapped is re-mapped in said same address area.

7. The computer system according to claim 6, wherein,
the first OS loads the second OS in an area of the memory allocated to the second OS, and activates the second OS, and the second OS maps the loaded multi-OS driver in said same address area.

8. The computer system according to claim 1, wherein the multi-OS driver notifies the second OS of an occurrence of an interrupt from a second hardware device of the plurality of hardware devices, if a notification destination of interrupts to an OS to be received from the second hardware device is registered as "the second OS".

9. The computer system according to claim 8, wherein the multi-OS driver notifies the first OS of no permission for using the second hardware device, when receiving a request for use of the second hardware device from the first OS.

* * * * *